United States Patent
Seki et al.

(10) Patent No.: US 12,109,608 B2
(45) Date of Patent: Oct. 8, 2024

(54) METHOD OF MANUFACTURING STEERING SHAFT

(71) Applicant: HITACHI ASTEMO, LTD., Hitachinaka (JP)

(72) Inventors: Takateru Seki, Hitachinaka (JP); Norihiro Kimura, Hitachinaka (JP); Takeo Okabe, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 274 days.

(21) Appl. No.: 17/637,759

(22) PCT Filed: Jun. 5, 2020

(86) PCT No.: PCT/JP2020/022237
§ 371 (c)(1),
(2) Date: Feb. 23, 2022

(87) PCT Pub. No.: WO2021/044685
PCT Pub. Date: Mar. 11, 2021

(65) Prior Publication Data
US 2022/0280995 A1    Sep. 8, 2022

(30) Foreign Application Priority Data

Sep. 3, 2019  (JP) ................................ 2019-160315

(51) Int. Cl.
| | |
|---|---|
| *B21H 3/04* | (2006.01) |
| *B21K 1/76* | (2006.01) |
| *B23K 20/12* | (2006.01) |
| *B62D 3/12* | (2006.01) |
| *B62D 5/04* | (2006.01) |

(52) U.S. Cl.
CPC ............... *B21H 3/04* (2013.01); *B23K 20/12* (2013.01); *B62D 3/12* (2013.01); *B62D 5/0448* (2013.01)

(58) Field of Classification Search
CPC ...... B21H 3/00; B21H 3/04; B21H 5/00–045; B23K 20/12
USPC .......................................................... 72/104
See application file for complete search history.

(56) References Cited

U.S. PATENT DOCUMENTS

2002/0112518 A1 *  8/2002  Sannomiya .............. B21H 3/04
                                                                    72/103
2006/0283655 A1    12/2006  Motz et al.

FOREIGN PATENT DOCUMENTS

| JP | H11-267785 A | 10/1999 |
|---|---|---|
| JP | 2003033841 A * | 2/2003 |
| JP | 2004-050250 A | 2/2004 |

(Continued)

OTHER PUBLICATIONS

English translate (JP2012040606A), retrieved date Jan. 23, 2024.*

(Continued)

*Primary Examiner* — Mohammed S. Alawadi
(74) *Attorney, Agent, or Firm* — Foley & Lardner LLP

(57) ABSTRACT

A method of manufacturing a rack bar includes: a rolling die abutment step of bringing a pair of rolling dies into abutment against an intermediate portion of a workpiece; and a ball screw groove forming step of forming a ball screw groove in the workpiece by moving the workpiece relative to the pair of rolling dies so that a region of the workpiece against which the pair of rolling dies is brought into abutment is moved from the intermediate portion toward a first end portion of the workpiece.

6 Claims, 8 Drawing Sheets

(56) References Cited

FOREIGN PATENT DOCUMENTS

| | | |
|---|---|---|
| JP | 3938430 B2 * | 6/2007 |
| JP | 2011-173169 A | 9/2011 |
| JP | 2012040606 A * | 3/2012 |

OTHER PUBLICATIONS

English translate (JP3938430B2), retrieved date Jan. 23, 2024.*
English translate (JP2003033841A), retrieved date Jan. 23, 2024.*
International Search Report dated Jul. 28, 2020 issued in International Application No. PCT/JP2020/022237, with English translation, 5 pages.
Written Opinion of the International Searching Authority dated Jul. 28, 2020 issued in International Application No. PCT/JP2020/022237, with English translation, 8 pages.

* cited by examiner

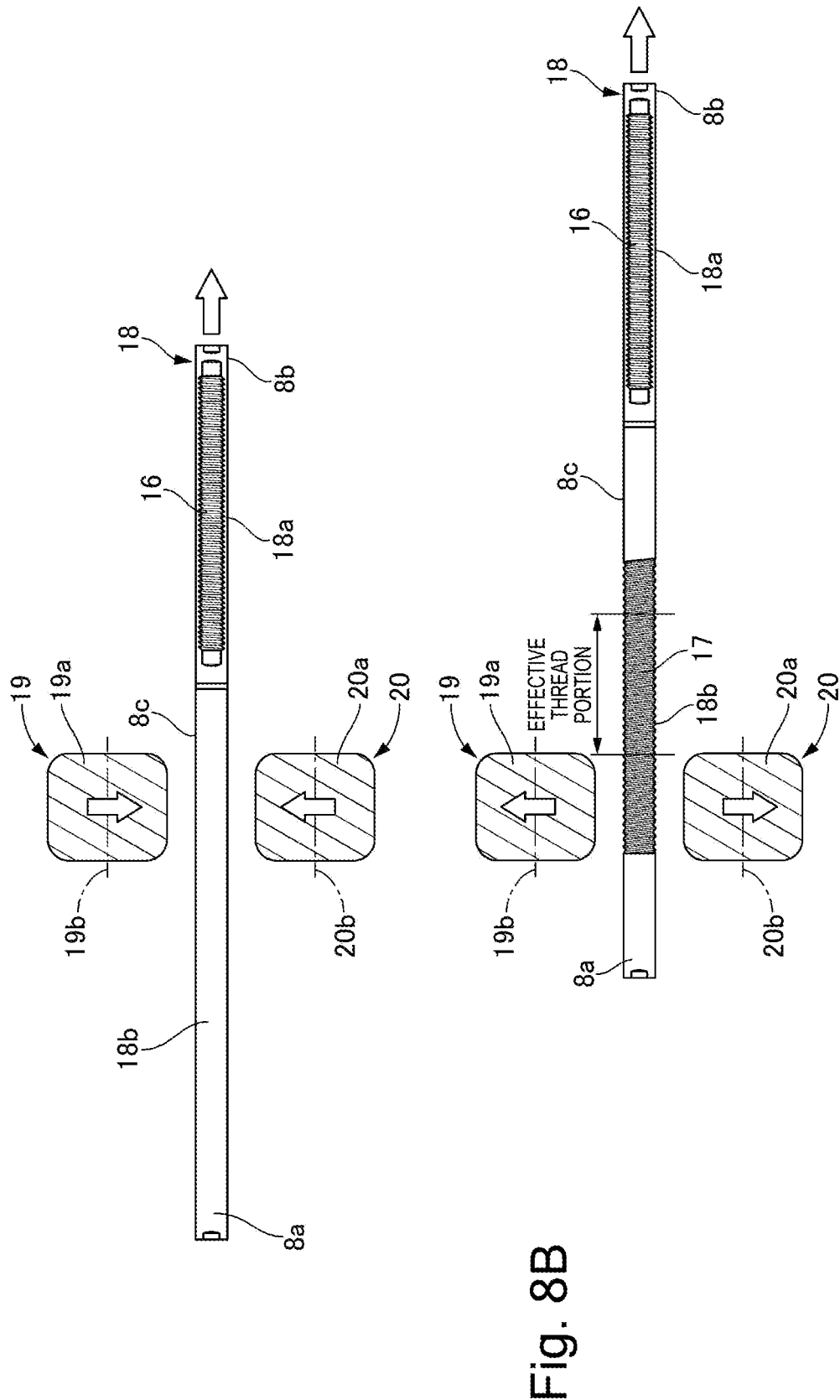

METHOD OF MANUFACTURING STEERING SHAFT

TECHNICAL FIELD

The present invention relates to a method of manufacturing a steering shaft of a steering device.

BACKGROUND ART

In Patent Literature 1, there is disclosed a technology in which, when a ball screw groove is to be formed in a bar-shaped workpiece being a material for a steering shaft, the workpiece is moved relative to rolling dies so that the rolling dies are moved from one end portion of the workpiece in an axial direction thereof toward an intermediate portion of the workpiece.

CITATION LIST

Patent Literature

PTL 1: JP 2011-173169 A

SUMMARY OF INVENTION

Technical Problem

However, in Patent Literature 1 described above, there is a fear in that processing accuracy of the ball screw groove is degraded due to oscillation of the workpiece at the start of rolling.

The present invention has an object to provide a method of manufacturing a steering shaft, which is capable of improving processing accuracy of the ball screw groove.

Solution to Problem

According to one embodiment of the present invention, there is provided a method of manufacturing a steering shaft, the method including:
a rolling die abutment step of bringing a rolling die into abutment against a workpiece being a material for forming a steering shaft; and
a ball screw groove forming step of forming a ball screw groove in the workpiece in the first state,
wherein in the rolling die abutment step, the rolling die is brought into abutment against an intermediate portion of the workpiece in a first state, and
wherein in the ball screw groove forming step, the workpiece is moved relative to the rolling die so that a region of the workpiece against which the rolling die is brought into abutment is moved from the intermediate portion toward a first end portion, thereby forming the ball screw groove in the workpiece and forming the workpiece in a second state.

Thus, according to one embodiment of the present invention, processing accuracy of the ball screw groove can be improved.

BRIEF DESCRIPTION OF DRAWINGS

FIGS. 8A-8B are views for illustrating a method of manufacturing the rack bar 8 according to a second embodiment.

DESCRIPTION OF EMBODIMENTS

First Embodiment

Figure 1:
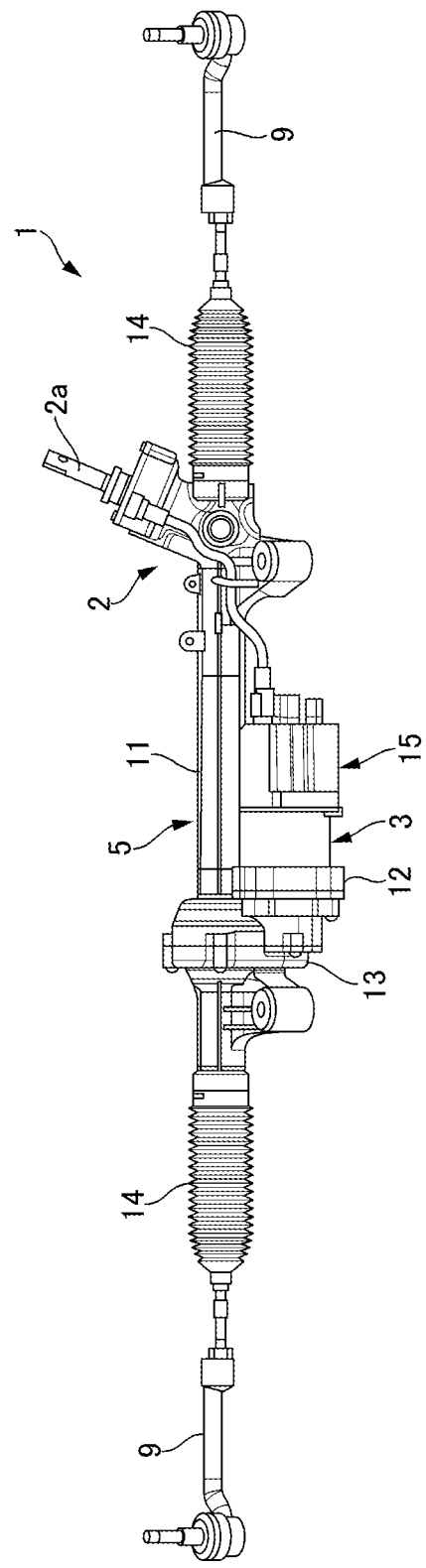
FIG. 1 is a view for illustrating a steering device 1 in a first embodiment when seen from a rear side of a vehicle.
Figure 2:
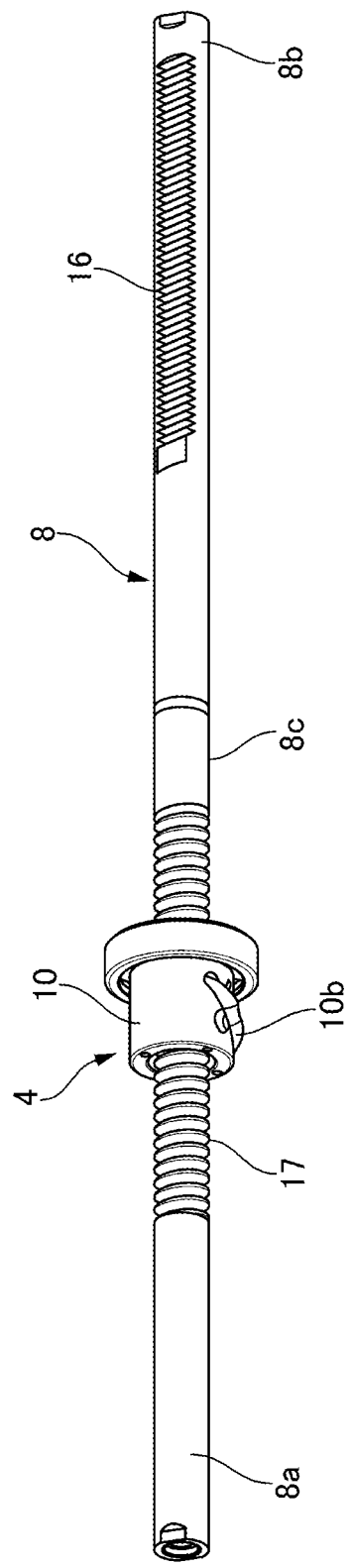
FIG. 2 is a perspective view for illustrating a rack bar 8 in the first embodiment.

FIG. 1 is a view for illustrating a steering device 1 in a first embodiment when seen from a rear side of a vehicle. FIG. 2 is a perspective view for illustrating a rack bar 8 in the first embodiment.

The steering device 1 is mounted in, for example, a vehicle including an engine as a power source. The steering device 1 includes a steering mechanism 2, an electric motor 3, a ball screw mechanism 4, and a housing 5.

The steering mechanism 2 steers a front wheel being a steered wheel, and includes the rack bar 8 extending in a vehicle width direction. The rack bar 8 is made of an iron-based metal material such as steel, and is formed into a bar shape. The rack bar 8 includes a first end portion 8a formed on one end side in a length direction (axial direction) of the rack bar 8, a second end portion 8b formed on another end side thereof, and an intermediate portion 8c formed between the first end portion 8a and the second end portion 8b. Rack teeth 16 are formed in an outer periphery of the rack bar 8 on the second end portion 8b side in the axial direction of the rack bar 8. Further, a ball screw groove 17 is formed in an outer periphery in a range from the first end portion 8a to the intermediate portion 8c in the axial direction of the rack bar 8.

The steering mechanism 2 includes a steering shaft 2a coupled to a steering wheel, and a pinion shaft including a pinion that meshes with the rack teeth 16. The steering shaft 2a and the pinion shaft are coupled to each other through a torsion bar. The rack bar 8 is moved in the vehicle width direction in accordance with rotation of the steering shaft 2a. End portions of a pair of tie rods 9 and 9 are connected to both ends of the rack bar 8, respectively. The front wheel is connected to each of the pair of tie rods 9 and 9.

The electric motor 3 applies a steering force to the steering mechanism 2. The electric motor 3 is, for example, a three-phase brushless motor. A motor pulley is fixed to an output shaft of the electric motor 3.

The ball screw mechanism 4 is provided between the steering mechanism 2 and the electric motor 3. The ball screw mechanism 4 converts a rotational force of the electric motor 3 into a propulsion force of the steering mechanism 2. The ball screw mechanism 4 includes a nut 10. The nut 10 is formed into a substantially cylindrical shape, and surrounds the rack bar 8. A nut pulley having an outer diameter larger than that of the motor pulley is fixed to an outer periphery of the nut 10. An endless belt is stretched between and around the nut pulley and the motor pulley. The nut 10 is supported so as to be rotatable relative to the housing 5 and immovable in the axial direction. The ball screw groove 17 forms a ball circulation groove together with a ball screw groove formed in an inner periphery of the nut 10. A plurality of balls are arranged in the ball circulation groove. The plurality of balls are moved to one end side or another end side of the ball circulation groove in accordance with rotation of the nut 10. The balls that have reached the one end or the another end of the ball circulation groove owing to rotation of the nut 10 are returned to the another end or the one end of the ball circulation groove via a tube 10b.

The housing 5 is made of an aluminum alloy, and is formed by die casting. The housing 5 includes a steering mechanism accommodating portion 11, a motor accommodating portion 12, and a ball screw mechanism accommodating portion 13. The steering mechanism accommodating portion 11 accommodates therein a part of the steering mechanism 2 (for example, a part of the steering shaft, and the rack bar 8). An inner end of a dust boot 14 in the vehicle width direction is fixed to each end of the steering mechanism accommodating portion 11 in the vehicle width direction. The dust boot 14 is made of, for example, rubber, and is formed into an annular and bellows shape. An outer end of the dust boot 14 in the vehicle width direction is fixed to the tie rod 9. The motor accommodating portion 12 accommodates therein the electric motor 3. The ball screw mechanism accommodating portion 13 accommodates therein the ball screw mechanism 4.

The electric motor 3 is controlled by a control unit 15. The control unit 15 is a control board including a microcomputer mounted thereon, and is accommodated in the motor accommodating portion 12 together with the electric motor 3. The control unit 15 calculates a target assist torque for reducing a steering load on a driver based on, for example, a steering torque given by the driver and input to the steering mechanism 2, and a vehicle speed. For example, as the steering torque is higher or the vehicle speed is lower, the target assist torque is set to a larger value. The control unit 15 controls an electric current to be applied to the electric motor 3 so that torque output by the electric motor 3 matches the target assist torque.

Figure 3:
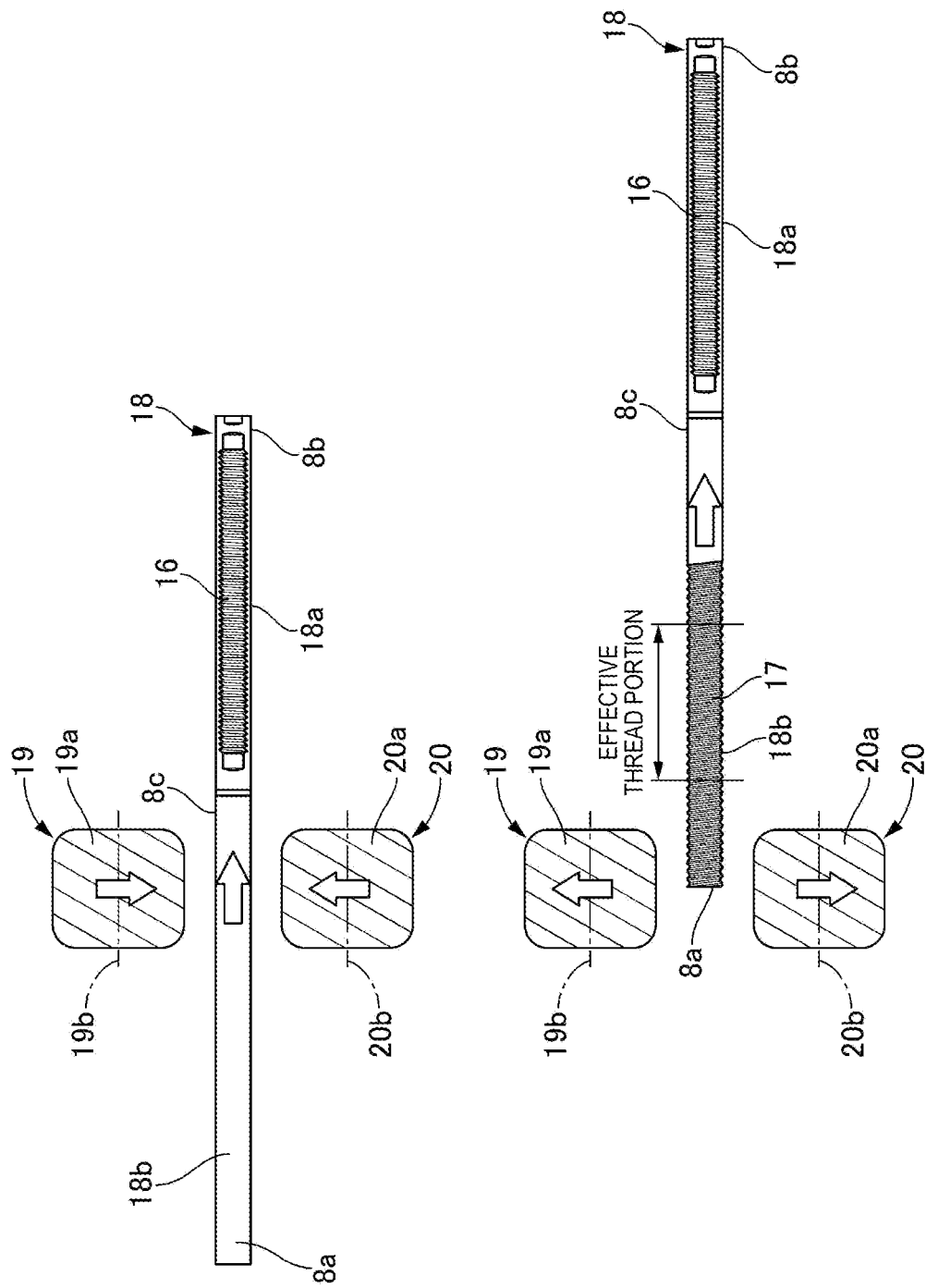
FIGS. 3A-3B are views for illustrating a method of manufacturing the rack bar 8 according to the first embodiment.

Next, description is given of a step of forming the ball screw groove 17 in a method of manufacturing the rack bar 8 according to the first embodiment. In the first embodiment, the ball screw groove 17 is formed by a twin-round-die rolling method, that is, a rolling method of sandwiching a workpiece being a material for the rack bar between the rolling dies each having a roller shape and then processing the workpiece by causing the material to bulge through rotation of rolling dies and periodic compression. The method of manufacturing the rack bar 8 according to the first embodiment includes a rolling die abutment step, a ball screw groove forming step, and a rolling die separation step, as steps of forming the ball screw groove 17. FIGS. 3A-3B are views for illustrating the method of manufacturing the rack bar 8 according to the first embodiment. FIG. 3A is an illustration of a state at the start of rolling, and FIG. 3B is an illustration of a state at the end of rolling.

In the rolling die abutment step, as illustrated in FIG. 3A, a pair of rolling dies 19 and 20 is brought into abutment against the intermediate portion 8c of a workpiece (workpiece in a first state) 18 being a material for forming the rack bar 8. In this case, a region of the workpiece 18 against which the pair of rolling dies 19 and 20 is brought into abutment is separated by a predetermined distance in the axial direction of the rack bar 8 to the second end portion 8b side from an effective thread portion (complete thread portion) that is a portion of the ball screw groove 17 on which the balls are actually moved. The workpiece 18 is obtained by joining two bar-like bodies 18a and 18b to each other in the axial direction by friction welding. The bar-like body 18a includes the second end portion 8b, and the bar-like body 18b includes the first end portion 8a and the intermediate portion 8c. The rack teeth 16 of the bar-like body 18a are formed before the bar-like body 18a is joined to the bar-like body 18b by friction welding. The pair of rolling dies 19 and 20 is arranged with a predetermined distance in a direction orthogonal to the axial direction of the workpiece 18. The pair of rolling dies 19 and 20 includes projecting portions 19a and 20a, respectively. Each of the projecting portions 19a and 20a is formed on a surface of the rolling die in a spiral and continuous manner. Rotation axes 19b and 20b of the pair of rolling dies 19 and 20 each have a feed angle slightly inclined with respect to the axial direction of the workpiece 18.

Figure 4:
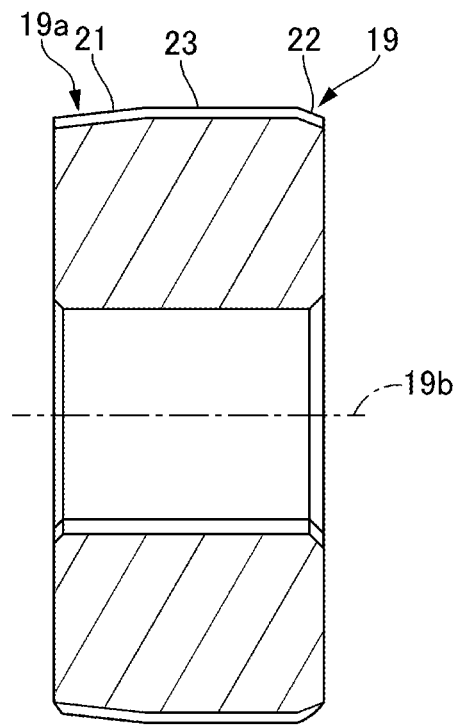
FIG. 4 is a side view for illustrating a rolling die 19.

FIG. 4 is a side view for illustrating the rolling die 19. The projecting portion 19a of the rolling die 19 includes a lead portion 21, a relief portion 22, and a parallel portion 23. In a direction along the rotation axis 19b, the lead portion 21 is formed at one end of the projecting portion 19a, and the relief portion 22 is formed at another end of the projecting portion 19a. The parallel portion 23 is formed between the lead portion 21 and the relief portion 22. A length of the lead portion 21 is larger than a length of the relief portion 22, and a lead angle (angle of the lead portion 21 with respect to the rotation axis 19b) is smaller than a relief angle (angle of the relief portion 22 with respect to the rotation axis 19b). The parallel portion 23 has a complete mountain shape, and is parallel to the rotation axis 19b. The rolling die 20 has the same shape as that of the rolling die 19.

In the rolling die abutment step, the workpiece 18 is inserted between the pair of rolling dies 19 and 20 from the second end portion 8b side, and the pair of rolling dies 19 and 20 is brought close to each other so as to sandwich the workpiece 18 therebetween. At this time, an entire region of the projecting portion 19a (including the lead portion 21, the relief portion 22, and the parallel portion 23) is brought into abutment against the workpiece 18.

In the ball screw groove forming step, after the rolling die abutment step, the workpiece 18 is moved relative to the pair of rolling dies 19 and 20 so that the region of the workpiece 18 against which the pair of rolling dies 19 and 20 is brought into abutment is moved from the intermediate portion 8c toward the first end portion 8a, thereby forming the workpiece 18 (workpiece in a second state) in which the ball screw groove 17 is formed. Specifically, under a state in which the workpiece 18 is sandwiched between the pair of rolling dies 19 and 20, the pair of rolling dies 19 and 20 is rotated at the same speed in the same direction, thereby forming the ball screw groove 17 in a region of the workpiece 18 from the intermediate portion 8c to the first end portion 8a. At this time, each of the pair of rolling dies 19 and 20 has the feed angle inclined with respect to the axial direction of the workpiece 18, and hence the workpiece 18 is automatically moved in its axial direction (direction indicated by the arrow in FIG. 3A) while rotating in a direction reverse to the rotating direction of the pair of rolling dies 19 and 20.

In the rolling die separation step, when the first end portion 8a of the workpiece 18 has passed the lead portions 21 of the pair of rolling dies 19 and 20 and reached the parallel portions 23 during the ball screw groove forming step, as illustrated in FIG. 3B, the pair of rolling dies 19 and 20 is separated away from the workpiece 18.

Next, operations and effects of the first embodiment are described.

In order to improve processing accuracy of the ball screw groove in the rack bar of the steering device, suppression of variations in pitch circle diameter (P.C.D) and improvement of a random walk are both required. The random walk refers to variations in lead, and is caused by a phase lead or a phase delay at a specific position while the rolling die makes one revolution (in one lead). Here, in order to stabilize the P.C.D., it is required that a cutting position of the rolling die (which is a rolling start position and a position at which the workpiece is first brought into abutment against the rolling die) be separated by an appropriate distance from the effective thread portion. However, in the related-art method of processing the ball screw groove, an end portion of the workpiece corresponds to the cutting position, and hence it is required to sandwich the workpiece with a relatively narrow range of the pair of rolling dies. In this case, at the start of rolling, the rolling dies are brought into abutment against the workpiece with narrow regions of the rolling dies, and hence cannot sandwich the workpiece firmly. As a result, particularly at the start of rolling, oscillation of the workpiece increases, and hence improvement of the random walk is insufficient.

Figure 5:
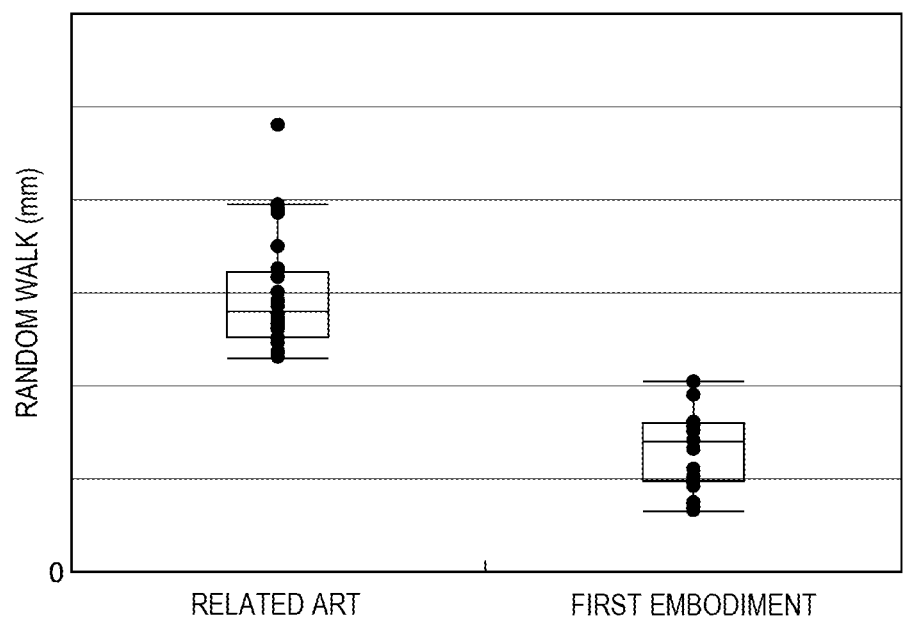
FIG. 5 is a graph for showing comparison of random walks.
Figure 6:
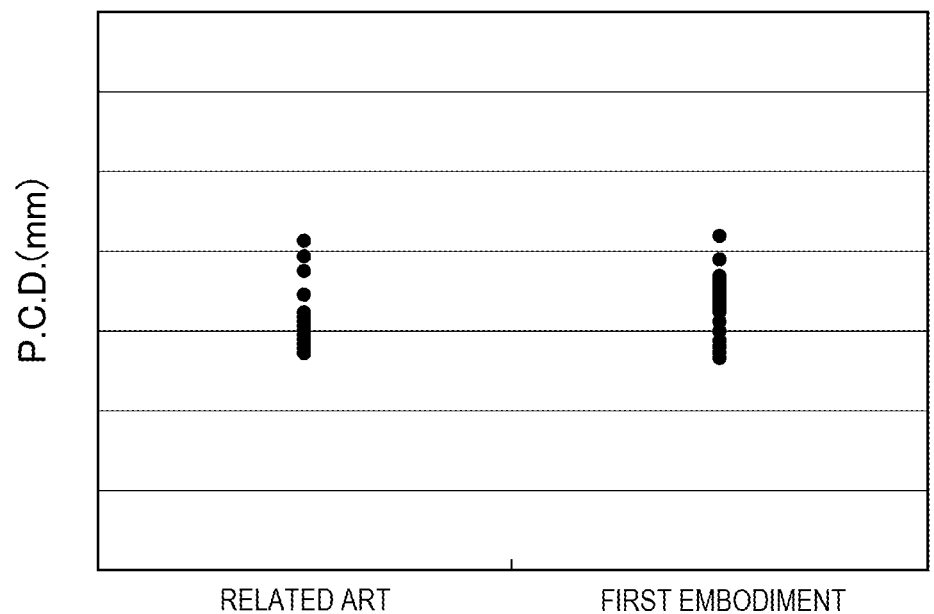
FIG. 6 is a graph for showing comparison of variations in pitch circle diameter (P.C.D.).

In contrast, the method of manufacturing the rack bar 8 according to the first embodiment includes the rolling die abutment step of bringing the pair of rolling dies 19 and 20 into abutment against the intermediate portion 8c of the workpiece 18, and the ball screw groove forming step of forming the ball screw groove 17 in the workpiece 18 by moving the workpiece 18 relative to the pair of rolling dies 19 and 20 so that the region of the workpiece 18 against which the pair of rolling dies 19 and 20 is brought into abutment is moved from the intermediate portion 8c toward the first end portion 8a. That is, the position of cutting the workpiece 18 by the pair of rolling dies 19 and 20 is set not at the first end portion 8a but at the intermediate portion 8c. As is apparent from FIG. 3B, as compared to the first end portion 8a, the intermediate portion 8c of the rack bar 8 has a relatively wider region in which the effective thread portion is not formed, and hence a relatively wide range of the pair of rolling dies 19 and 20 can be brought into abutment against the workpiece 18 from the beginning of rolling. As a result, the workpiece 18 is firmly sandwiched between the pair of rolling dies 19 and 20, and oscillation of the workpiece 18 at the start of rolling is suppressed, thereby being capable of improving the random walk. FIG. 5 is a graph for showing comparison of random walks. FIG. 6 is a graph for showing comparison of variations in P.C.D. As shown in FIG. 5 and FIG. 6, in the method of manufacturing the rack bar 8 according to the first embodiment, while the variations in P.C.D. are kept at the same level as that of the related art, the random walk can be reduced by half. That is, stabilization of the P.C.D. and improvement of the random walk are both achieved, thereby being capable of significantly improving processing accuracy of the ball screw groove 17 as compared to the related-art manufacturing method.

Figure 7:
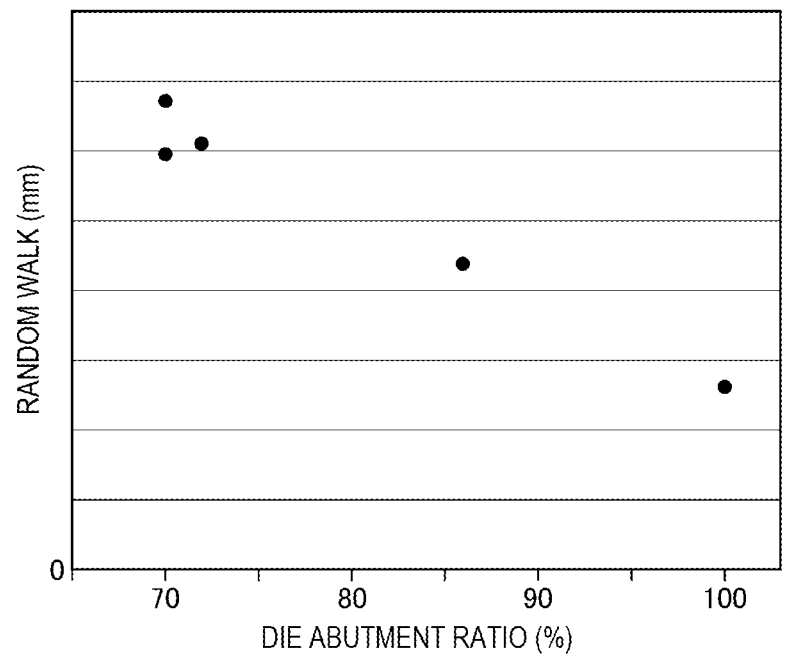
FIG. 7 is a graph for showing a relationship between a random walk and an abutment ratio (abutment width/projecting-portion width) of the rolling die 19 or a rolling die 20 with respect to a workpiece 18 at the time of die cutting.

Further, in the rolling die abutment step in the first embodiment, of the pair of rolling dies 19 and 20, the entire region of the projecting portion 19a (including the lead portion 21, the relief portion 22, and the parallel portion 23) is brought into abutment against the workpiece 18, and hence the workpiece 18 is firmly sandwiched between the pair of rolling dies 19 and 20. Thus, oscillation of the workpiece 18 at the start of rolling is suppressed. Under a state in which oscillation of the workpiece 18 is thus suppressed, rolling proceeds, thereby being capable of further improving processing accuracy of the ball screw groove 17. FIG. 7 is a graph for showing a relationship between a random walk and an abutment ratio (abutment width/projecting-portion width (die width)) of the rolling die 19 or the rolling die 20 with respect to the workpiece 18 at the time of die cutting. As is apparent from FIG. 7, as the abutment ratio of the rolling die 19 or the rolling die 20 is higher, oscillation of the workpiece 18 at the time of cutting is further suppressed, with the result that the random walk is improved. In the first embodiment, the abutment ratio of the rolling die 19 or the rolling die 20 is set to 100%, and hence the random walk can be minimized.

Moreover, in the rolling die abutment step in the first embodiment, the region of the workpiece 18 against which the pair of rolling dies 19 and 20 is brought into abutment is separated by a predetermined distance in the axial direction of the rack bar 8 to the second end portion 8b side from the effective thread portion of the ball screw groove 17. The region of the workpiece 18 against which the pair of rolling dies 19 and 20 is first brought into abutment is formed into an incomplete thread portion in many cases. Accordingly, through separation of the region against which the pair of rolling dies 19 and 20 is first brought into abutment by a predetermined distance from a region in which the effective thread portion is to be formed, the incomplete thread portion can be prevented from being formed in a region in which the effective thread portion is to be formed.

Second Embodiment

A basic configuration of a second embodiment is the same as that of the first embodiment, and hence only differences from the first embodiment are described.

FIGS. 8A-8B are views for illustrating a method of manufacturing the rack bar 8 according to the second embodiment. FIG. 8A is an illustration of a state at the start of rolling, and FIG. 8B is an illustration of a state at the end of rolling.

The second embodiment is different from the first embodiment in that the pair of rolling dies 19 and 20 is separated away from the workpiece 18 before the first end portion 8a of the workpiece 18 passes the entire regions of the pair of rolling dies 19 and 20. In the rolling die separation step, when the effective thread portion of the ball screw groove 17 has passed the relief portions 22 of the pair of rolling dies 19 and 20 during the ball screw groove forming step, as illustrated in FIG. 8B, the pair of rolling dies 19 and 20 is separated away from the workpiece 18. In this manner, the length of the ball screw groove 17 can be reduced to a minimum required length, thereby being capable of reducing a processing time period for the ball screw groove forming step.

Third Embodiment

A basic configuration of a third embodiment is the same as that of the first embodiment, and hence only differences from the first embodiment are described.

Figure 9A:
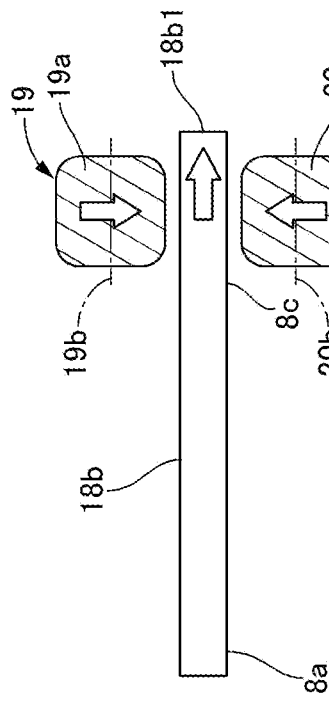
FIGS. 9A-9D are views for illustrating a method of manufacturing the rack bar 8 according to a third embodiment.
Figure 9B:
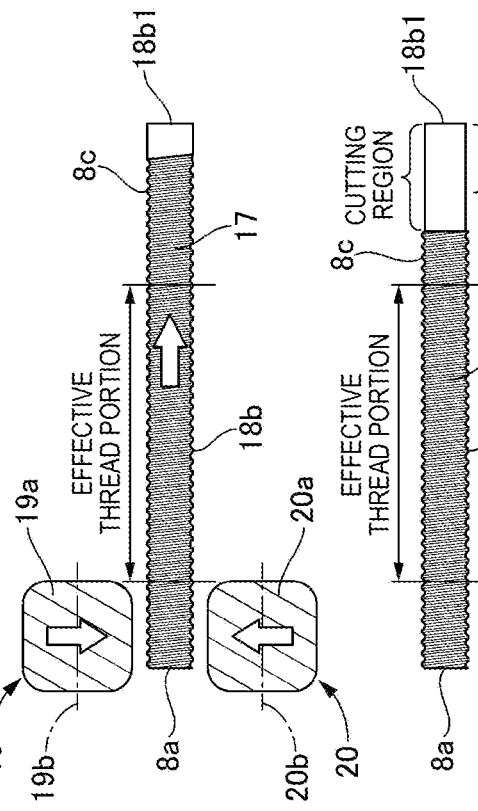
Figure 9C:
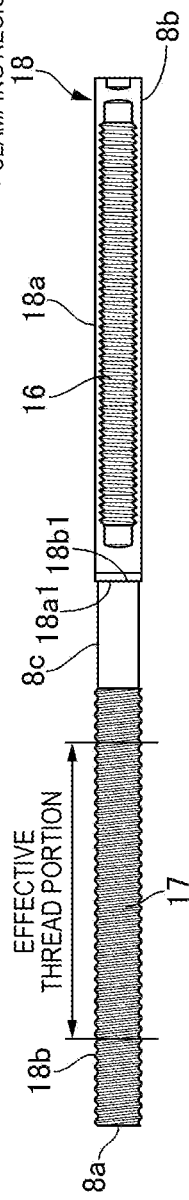
Figure 9D:
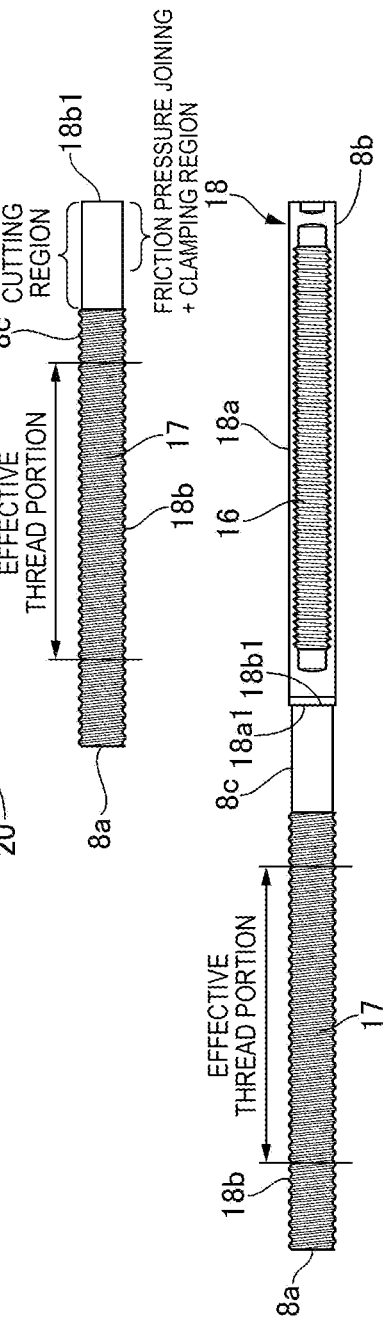

The third embodiment is different from the first embodiment in that the ball screw groove 17 is formed in the bar-like body 18b before the bar-like body (second member) 18a and the bar-like body (first member) 18b are joined to each other by friction welding. A method of manufacturing the rack bar 8 according to the third embodiment includes the rolling die abutment step, the ball screw groove forming step, the rolling die separation step, a diameter-reduced portion forming step, and a friction welding step. FIGS. 9A-9D are views for illustrating the method of manufacturing the rack bar 8 according to the third embodiment. FIG. 9A is an illustration of a state at the start of rolling, and FIG. 9B is an illustration of a state at the end of rolling. FIG. 9C is an illustration of a state at the end of forming a diameter-reduced portion, and FIG. 9D is an illustration of a state at the end of friction welding.

In the rolling die abutment step, the pair of rolling dies 19 and 20 is brought into abutment against, of both end portions 8a and 18b1 of the bar-like body (workpiece in the first state) 18b, the end portion 18b1 on the intermediate portion 8c side.

In the ball screw groove forming step, the bar-like body 18b is moved relative to the pair of rolling dies 19 and 20 so that a region of the bar-like body 18b against which the pair of rolling dies 19 and 20 is brought into abutment is moved from the end portion 18b1 toward the end portion 8a, thereby forming the bar-like body (workpiece in the second state) 18b in which the ball screw groove 17 is formed.

In the diameter-reduced portion forming step, after the ball screw groove forming step, under a state in which the ball screw groove 17 is formed in the bar-like body 18b, a predetermined range of the bar-like body 18b including the intermediate portion 8c is cut by machining so that a radially outer diameter of the bar-like body 18b with respect to a center axis of the bar-like body 18b is equal to an outer diameter of a bottom of the ball screw groove 17. The cutting range corresponds to a range including a region of the bar-like body 18b to be held by a clamp in the friction welding step.

In the friction welding step, after the diameter-reduced portion forming step, the end portion 18b1 of the bar-like body is joined by friction welding to, of both end portions 18a1 and 8b of the bar-like body 18a, the end portion 18a1 opposite to the second end portion 8b. The friction welding step is performed under a state in which a predetermined region of the bar-like body 18b on the end portion 18b1 side within the cutting region is held by the clamp.

In the third embodiment, the ball screw groove 17 is formed in the vicinity of the end portion 18b1 of the bar-like body 18b to be joined to the bar-like body 18a by friction welding. A portion of the ball screw groove 17 to be subjected to friction welding is cut in the diameter-reduced portion forming step, and hence both of the bar-like bodies 18a and 18b can be joined to each other by friction welding. Further, in the diameter-reduced portion forming step, the bar-like body 18b is reduced in diameter so that the radially outer diameter of bar-like body 18b is substantially equal to the outer diameter of the bottom of the ball screw groove 17. Accordingly, a portion of the bar-like body 18b to be subjected to friction welding has a relatively flat outer peripheral surface and a circular cross section. Under a state in which both of the bar-like bodies 18a and 18b are held in abutment against each other at the time of friction welding, both of the bar-like bodies 18a and 18b are easily matched with each other in sectional area and shape. Moreover, the outer peripheral surface of the portion of the bar-like body 18b to be held by the clamp has a relatively flat shape, and hence clamping is easily performed.

Fourth Embodiment

A basic configuration of a fourth embodiment is the same as that of the first embodiment, and hence only differences from the first embodiment are described.

Figure 10:
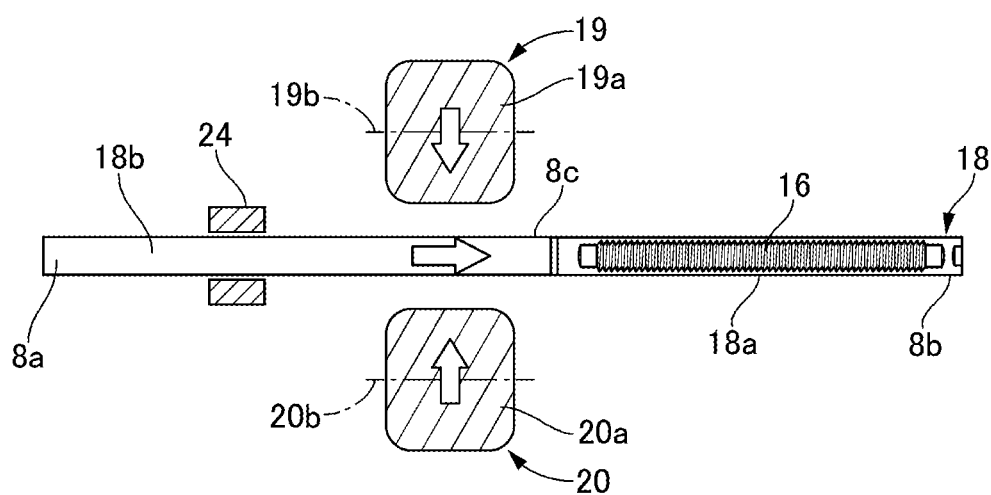
FIG. 10 is a view for illustrating a method of manufacturing the rack bar 8 according to a fourth embodiment.

FIG. 10 is a view for illustrating a method of manufacturing the rack bar 8 according to the fourth embodiment, and is an illustration of a state at the start of rolling.

The fourth embodiment is different from the first embodiment in that, in the ball screw groove forming step, a position of the intermediate portion 8c of the workpiece 18 close to the first end portion 8a is supported by a support bush 24 as a workpiece rest. The support bush 24 is made of, for example, rubber, and is formed into an annular shape. The workpiece 18 is passed through an inside of the support bush 24. From the start to the end of rolling, the workpiece 18 in the midst of rolling is supported at two points, that is, at the pair of rolling dies 19 and 20 and the support bush 24. Accordingly, oscillation of the workpiece 18 can be further suppressed, and processing accuracy of the ball screw groove 17 can be further improved.

OTHER EMBODIMENTS

The mode for carrying out the present invention has been described above based on the embodiments. However, the specific configuration of the present invention is not limited to the configurations described in the embodiments. A change in design without departing from the scope of the gist of the invention is encompassed in the present invention.

Description is given of the example in which the entire regions of the mountain portions of the pair of rolling dies are brought into abutment against the workpiece in the rolling die abutment step. However, it is only required that at least entire regions of the parallel portions be brought into abutment against the workpiece.

It is only required that the diameter-reduced portion forming step be performed so that the outer diameter of the diameter-reduced portion of the first member is substantially equal to the outer diameter of the bottom of the ball screw groove. The diameter-reduced portion may have a slight dimension error.

In the first embodiment, the workpiece 18 is a workpiece obtained by joining the two bar-like bodies 18a and 18b to each other by friction welding. However, there may also be used an integrated workpiece 18 having the rack teeth 16 formed in advance.

In the second embodiment, in the rolling die separation step, the pair of rolling dies 19 and 20 is separated away from the workpiece 18 when the effective thread portion of the ball screw groove 17 has passed the relief portions 22 of the pair of rolling dies 19 and 20. However, a purpose of the second embodiment is to reduce the processing time period, and hence it is not required to limit the separation timing to the above-mentioned timing. That is, as long as the effective thread portion is formed with allowable thread accuracy of the effective thread portion even when the relief portions 22 of the pair of rolling dies 19 and 20 do not pass the effective thread of the ball screw groove 17, the pair of rolling dies 19 and 20 may be separated away from the workpiece 18.

Technical ideas that can be grasped based on the embodiments described above are described below.

According to one aspect of the technical ideas, there is provided a method of manufacturing a steering shaft, the steering shaft having a bar shape, and including a first end portion, a second end portion, and an intermediate portion formed between the first end portion and the second end portion, the method including: a rolling die abutment step of bringing a rolling die into abutment against a workpiece being a material for forming the steering shaft; and a ball screw groove forming step of forming a ball screw groove in the workpiece in a first state. In the rolling die abutment step, the rolling die is brought into abutment against the intermediate portion of the workpiece in the first state. In the ball screw groove forming step, the workpiece is moved relative to the rolling die so that a region of the workpiece against which the rolling die is brought into abutment is moved from the intermediate portion toward the first end portion, thereby forming the ball screw groove in the workpiece and forming the workpiece in a second state.

According to another preferred aspect, in the above-mentioned aspect, the method of manufacturing a steering shaft further includes a rolling die separation step. In the rolling die separation step, the rolling die is separated away from the workpiece before the first end portion of the workpiece passes an entire region of the rolling die in the ball screw groove forming step.

According to still another preferred aspect, in any one of the above-mentioned aspects, the method of manufacturing a steering shaft further includes a diameter-reduced portion forming step and a friction welding step. The steering shaft includes: a first member, which has the ball screw groove formed therein, and includes the first end portion and the intermediate portion; and a second member, which is connected to the first member, and includes the second end portion. When an axis of the first member, which passes a center of the steering shaft in a cross section orthogonal to a longitudinal direction of the steering shaft and is parallel to the longitudinal direction of the steering shaft, is defined as a center axis, in the diameter-reduced portion forming step, under a state in which the ball screw groove is formed in the first member in the ball screw groove forming step, a predetermined range of the first member including the intermediate portion is cut by machining so that a radially outer diameter of the first member with respect to the center axis of the first member is equal to an outer diameter of a bottom of the ball screw groove, and in the friction welding step, an end portion of the first member opposite to the first end portion, and an end portion of the second member opposite to the second end portion are joined to each other by friction welding.

According to still another preferred aspect, in any one of the above-mentioned aspects, the friction welding step is performed under a state in which the first member is held by a clamp. In the diameter-reduced portion forming step, a range of the first member, which includes a region of the first member to be held by the clamp, is cut by machining.

According to still another preferred aspect, in any one of the above-mentioned aspects, the region of the workpiece against which the rolling die is brought into abutment is separated by a predetermined distance from a complete thread portion of the ball screw groove in a longitudinal direction of the steering shaft.

According to still another preferred aspect, in any one of the above-mentioned aspects, the ball screw groove forming step is performed under a state in which the workpiece is supported by a workpiece rest.

According to still another preferred aspect, in any one of the above-mentioned aspects, there is provided a method of manufacturing a steering shaft, the steering shaft having a bar shape, and including a first end portion, a second end portion, and an intermediate portion formed between the first end portion and the second end portion, the method including: a rolling die abutment step of bringing a rolling die into abutment against a workpiece being a material for forming the steering shaft; and a ball screw groove forming step of forming a ball screw groove in the workpiece in a first state. In the rolling die abutment step, in a longitudinal direction of the steering shaft of the rolling die, entire regions of the parallel portions, which are portions other than a lead portion and a relief portion, are brought into abutment against the workpiece in the first state. In the ball screw groove forming step, the workpiece is moved relative to the rolling die so that a region of the workpiece against which the rolling die is brought into abutment is moved along the longitudinal direction of the steering shaft, thereby forming the ball screw groove in the workpiece and forming the workpiece in a second state.

According to still another preferred aspect, in any one of the above-mentioned aspects, in the rolling die abutment step, the rolling die is brought into abutment against the intermediate portion of the workpiece in the first state. In the ball screw groove forming step, the workpiece is moved relative to the rolling die so that the region of the workpiece against which the rolling die is brought into abutment is moved from the intermediate portion toward the first end portion, thereby forming the ball screw groove in the workpiece and forming the workpiece in the second state.

Note that, the present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2019-160315 filed on Sep. 3, 2019. All disclosed contents including Specification, Scope of Claims, Drawings, and Abstract of Japanese Patent Application No. 2019-160315 filed on Sep. 3, 2019 are incorporated herein by reference in their entirety.

REFERENCE SIGNS LIST 1 steering device, 8 rack bar (steering shaft), 8a first end portion, 8b second end portion, 8c intermediate portion, 17 ball screw groove, 18 workpiece, 18a bar-like body (second member), 18b bar-like body (first member), 19 rolling die, 20 rolling die, 24 support bush (workpiece rest)

The invention claimed is:

1. A method of manufacturing a steering shaft of a steering device, the steering shaft having a bar shape, and including a first end portion, a second end portion, and an intermediate portion formed between the first end portion and the second end portion, the method comprising:
a rolling die abutment step of bringing a rolling die into abutment against a workpiece being a material for forming the steering shaft; and
a ball screw groove forming step of forming a ball screw groove in the workpiece in a first state,
wherein in the rolling die abutment step, the rolling die is brought into abutment against the intermediate portion of the workpiece in the first state, and
wherein in the ball screw groove forming step, the workpiece is moved relative to the rolling die so that a region of the workpiece against which the rolling die is brought into abutment is moved from the intermediate portion toward the first end portion, thereby forming the ball screw groove in the workpiece and forming the workpiece in a second state, the method of manufacturing the steering shaft further comprising a diameter-reduced portion forming step and a friction welding step, wherein the steering shaft includes:

a first member, which has the ball screw groove formed therein, and includes the first end portion and the intermediate portion; and a second member, which is connected to the first member, and includes the second end portion, and wherein when an axis of the first member, which passes a center of the steering shaft in a cross section orthogonal to a longitudinal direction of the steering shaft and is parallel to the longitudinal direction of the steering shaft, is defined as a center axis, in the diameter-reduced portion forming step, under a state in which the ball screw groove is formed in the first member in the ball screw groove forming step, a predetermined range of the first member including the intermediate portion is cut by machining so that a radially outer diameter of the first member with respect to the center axis of the first member is equal to an outer diameter of a bottom of the ball screw groove, and in the friction welding step, an end portion of the first member opposite to the first end portion, and an end portion of the second member opposite to the second end portion are joined to each other by friction welding.

2. The method of manufacturing the steering shaft according to claim 1, further comprising a rolling die separation step, wherein in the rolling die separation step, the rolling die is separated away from the workpiece before the first end portion of the workpiece passes an entire region of the rolling die in the ball screw groove forming step.

3. The method of manufacturing the steering shaft according to claim 1, wherein the friction welding step is performed under a state in which the first member is held by a clamp, and wherein in the diameter-reduced portion forming step, a range of the first member, which includes a region of the first member to be held by the clamp, is cut by machining.

4. The method of manufacturing the steering shaft according to claim 1, wherein the region of the workpiece against which the rolling die is brought into abutment is separated by a predetermined distance from a complete thread portion of the ball screw groove in a longitudinal direction of the steering shaft.

5. The method of manufacturing the steering shaft according to claim 1, wherein the ball screw groove forming step is performed under a state in which the workpiece is supported by a workpiece rest.

6. A method of manufacturing a steering shaft of a steering device, the steering shaft having a bar shape, and including a first end portion, a second end portion, and an intermediate portion formed between the first end portion and the second end portion, the method comprising:

a rolling die abutment step of bringing a rolling die into abutment against a workpiece being a material for forming the steering shaft; and a ball screw groove forming step of forming a ball screw groove in the workpiece in a first state, wherein in the rolling die abutment step, in a longitudinal direction of the steering shaft of the rolling die, entire regions of the parallel portions, which are portions other than a lead portion and a relief portion, are brought into abutment against the workpiece in the first state, and wherein in the ball screw groove forming step, the workpiece is moved relative to the rolling die so that a region of the workpiece against which the rolling die is brought into abutment is moved along the longitudinal direction of the steering shaft, thereby forming the ball screw groove in the workpiece and forming the workpiece in a second state, the method of manufacturing the steering shaft further comprising a diameter-reduced portion forming step and a friction welding step, wherein the steering shaft includes:

a first member, which has the ball screw groove formed therein, and includes the first end portion and the intermediate portion; and a second member, which is connected to the first member, and includes the second end portion, and wherein when an axis of the first member, which passes a center of the steering shaft in a cross section orthogonal to a longitudinal direction of the steering shaft and is parallel to the longitudinal direction of the steering shaft, is defined as a center axis, in the diameter-reduced portion forming step, under a state in which the ball screw groove is formed in the first member in the ball screw groove forming step, a predetermined range of the first member including the intermediate portion is cut by machining so that a radially outer diameter of the first member with respect to the center axis of the first member is equal to an outer diameter of a bottom of the ball screw groove, and in the friction welding step, an end portion of the first member opposite to the first end portion, and an end portion of the second member opposite to the second end portion are joined to each other by friction welding.

* * * * *